United States Patent [19]

Bomar

[11] 4,250,680
[45] Feb. 17, 1981

[54] CLAD WINDOW

[75] Inventor: William H. Bomar, Grimes, Iowa

[73] Assignee: Monarch Manufacturing Co., Waukee, Iowa

[21] Appl. No.: 29,327

[22] Filed: Apr. 12, 1979

[51] Int. Cl.³ .............................................. E04C 2/38
[52] U.S. Cl. ...................................... 52/656; 40/152; 403/401; 403/402
[58] Field of Search ........................ 52/656, 476, 477; 403/401, 402; 40/152, 155

[56] References Cited

U.S. PATENT DOCUMENTS

| 578,200 | 3/1897 | Bower | 40/155 |
|---|---|---|---|
| 1,702,626 | 2/1929 | Beyrle | 40/152 |
| 2,491,700 | 12/1949 | Zwerling | 248/58 |
| 3,349,536 | 10/1967 | Halko et al. | 52/475 |
| 3,815,285 | 6/1974 | Kuyper | 52/716 |
| 4,122,633 | 10/1978 | Holdiman | 52/727 |

FOREIGN PATENT DOCUMENTS

| 275315 | 3/1963 | Australia | 40/152 |
|---|---|---|---|
| 1953526 | 5/1971 | Fed. Rep. of Germany | 403/401 |
| 206012 | 11/1923 | United Kingdom | 40/155 |

Primary Examiner—James L. Ridgill, Jr.
Attorney, Agent, or Firm—Zarley, McKee, Thomte, Voorhees & Sease

[57] ABSTRACT

A clad window wherein a wooden window frame assembly has each of its frame members covered with metal cladding, with each of the cladding members having at its ends beveled edges which join with the beveled edge of another cladding member to form a mitered corner. The beveled edges of each cladding member have a portion of the edge turned back to provide a flange and a cladding retaining clip releaseably engages the flanges of each beveled edge, at each of the mitered corners, to releaseably and sealingly secure the cladding to the window frame assembly. When repair work is needed retaining clips are removed, the window frame may be disassembled, the repair work accomplished, cladding slipped back into position and the retaining clips again attached for releaseable and sealing securement.

6 Claims, 6 Drawing Figures

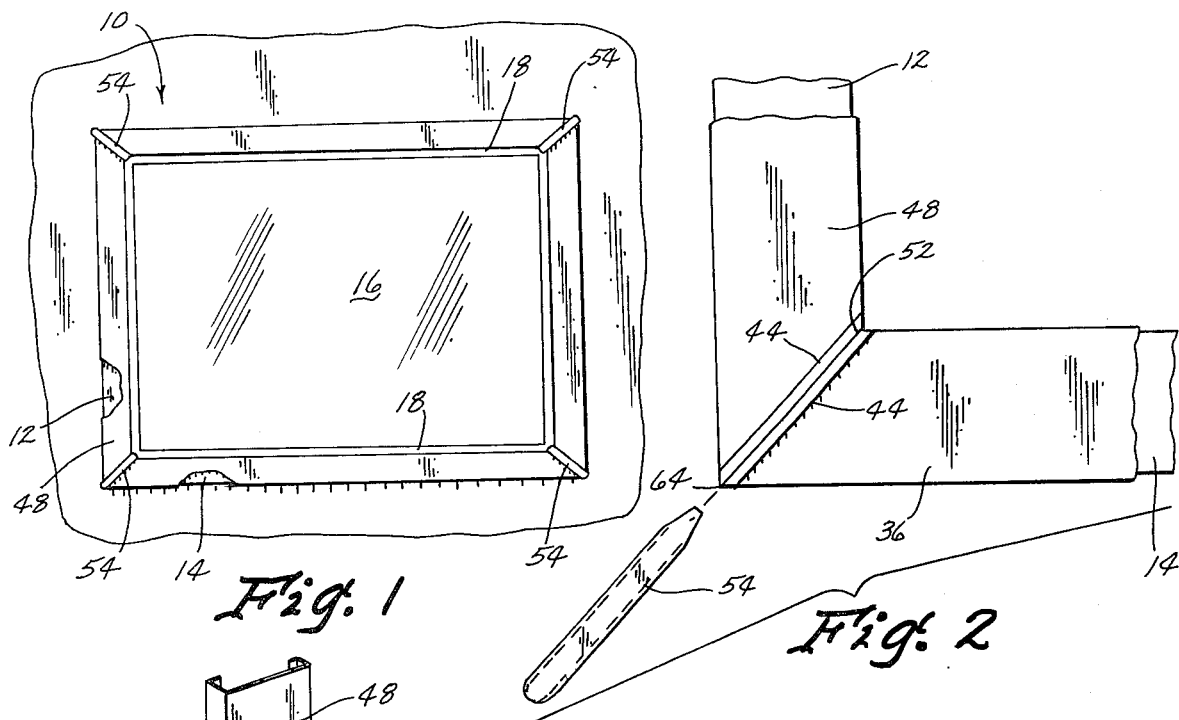
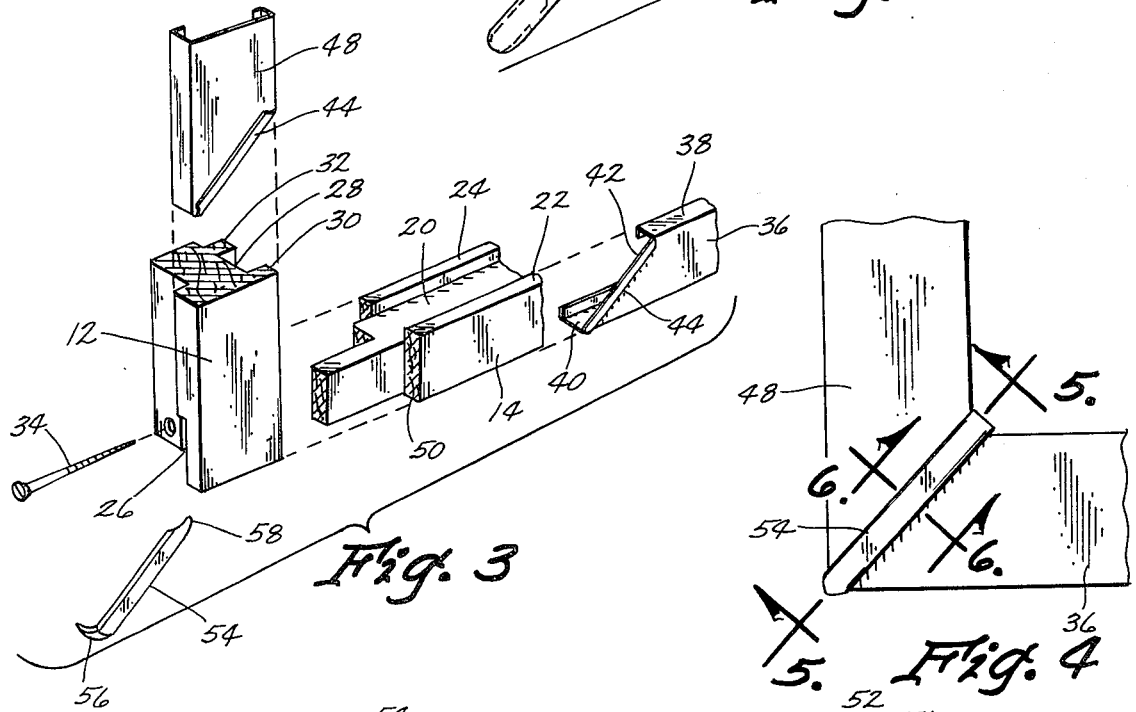
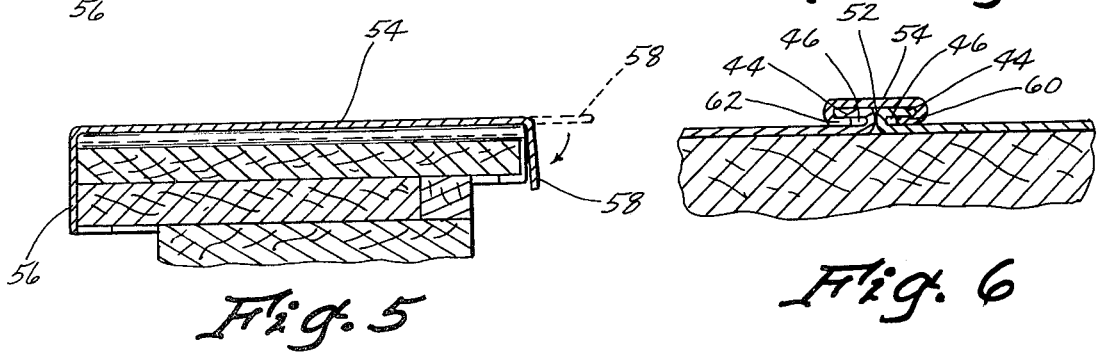

CLAD WINDOW

BACKGROUND OF THE INVENTION

This invention relates to clad window products, and the method of attaching the cladding thereto for quick, easy releaseable engagement in case window repair is needed.

As those skilled in the art know, wooden window casings and frames are commonly employed. Such wooden window casings and frames are generally preferred by consumer users in that they are far more attractive than metal windows and frames. Additionally, wooden windows are often preferred in cold weather climates because of their improved insulating factor when compared with conductive metal window frames.

Although wooden windows have the above mentioned significant advantages, and are therefore generally preferred, having their exterior exposed to environmental changes does present problems. Often, the exterior portion of such wooden windows does not weather nearly as well as metal frame windows which are more resistant to environmental factors, such as freezing and thawing, wind, rain, snow and the like. Additionally, exterior surfaces of metal windows do not need nearly as much repair.

Clad windows as that term is used in the art, has come to define a window which is essentially a wooden window framework having on its exteriorally exposed side a covering of metal. Typically such metal is aluminum, which may for example, be roll formed aluminum having a thickness of 0.02 to 0.03 inches. Most commonly aluminum is used because of its resistance to climate conditions and its ease of availability and its machining characteristics as well.

Thus, cladding has become popular in that it combines the advantageous features of wooden windows with the advantageous exterior weather resistant features of metal window frames. However, cladding does have its disadvantages.

In particular, when a window pane must be replaced, it is much more difficult with clad windows. Cladding must be removed, the pane replaced, and thereafter, the cladding returned to its proper position. With conventional clad windows on the market, this is time consuming, and often an expensive process. The cladding, once placed back in position, never does effectively seal the exterior of the window as good as it did originally.

Accordingly, the primary object of this invention is to provide a clad window, with the cladding characterized by effectively sealing the exterior portion of the wooden window casing from weather conditions, coupled with the additional advantage that the cladding is easily removable, and after window repair easily returned to its proper position to provide an effective exterior coating. Moreover, these advantages are accomplished in a manner which provides effective sealing joints for the cladding which are moisture impervious, attractive in appearance, and which may be disassembled and reassembled without any significant deterioration in the joint sealing effectiveness.

Yet another object of this invention is to provide a metal clad window which is simple of construction, quick to assemble, quick to disassemble and quick to reassemble.

Further purposes and objects of this invention will become apparent from the detailed description which follows.

SUMMARY OF THE INVENTION

The invention relates to a clad window which comprises a pair of spaced apart, substantially parallel stiles, and a pair of spaced apart, substantially parallel rails which join the stiles to form a window frame assembly, with the exterior facing portion of the window frame assembly having a metal cladding member covering the same, each of the cladding members having at its ends beveled edges which join with the beveled edges of another cladding member to form a mitered corner, with each of the beveled edges having a portion thereof turned back to provide a flange so that a cladding retaining clip may releaseably engage said flanges at the mitered corner for releaseable and sealing securement of the cladding to the window frame assembly.

BRIEF DESCRIPTION OF THE DRAWINGS

FIG. 1 is a front elevational view of a clad window of this invention.

FIG. 2 is an enlarged plan view of the corner of the window frame assembly of this invention with the retaining clip removed.

FIG. 3 is an exploded perspective view of the window frame assembly.

FIG. 4 is a view similar to FIG. 2 showing the retaining clip in its engaged locking position.

FIG. 5 is a sectional view along line 5—5 of FIG. 4.

FIG. 6 is a sectional view along line 6—6 of FIG. 4.

DETAILED DESCRIPTION OF THE INVENTION

At the outset, it should be mentioned that the clad window 10 of this invention and its method of use may be employed in a variety of ways, including casement windows, awning windows, picture windows, as well as others, the basic invention not being limited to any particular type of window. Referring to FIGS. 1 and 3, particularly, the clad window 10 has a pair of spaced apart substantially parallel stiles 12 (only one is shown in FIG. 3) and a pair of substantially parallel spaced apart rails 14 (only one is shown in FIG. 3) which join at each end to form a joint and hence a window frame assembly is provided which may hold window glazing panel 16, sealed therein by glazing gasket 18.

Stile 12 and rail 14 are milled from conventional window frame lumber. Looking first at rail 14, it has a longitudinally extending rabbet 20, the upper margins of which are defined by outer shoulder 22 and inner shoulder 24. At each end, rail 14 has tenon 24. Tenon 24 is adapted for mating receipt in mortice 26 of stile 12. Stile 12 also has rabbet 28 which extends longitudinally, the length thereof, with its upper margins defined by shoulders 30 and 32. Stile 12 is releaseably secured to rail 14 by wood screw 34 which extends through stile 12 into a portion of tenon 24. In this manner, the basic window frame assembly is provided. Glazing panel 16 rests within the wooden assembly in the groove defined by rabbets 20 and 28. It is, of course, to be understood that a single panel window is shown, but that double thickness glass may be employed as well, without departing from the spirit and scope of the invention.

The aluminum cladding for rail 14 is best shown in FIG. 3. The cladding member 36 provides a cladding panel for the exteriorally exposed portion of rail 14.

Cladding panel 36 has an upper or top cladding lip 38 and a bottom cladding lip 40, and at its end extending from the end portion of upper lip 38 to bottom cladding lip 40 is beveled edge 42. Beveled edge 42 is a 45° cut so that it may be joined with a second beveled edge to form a mitered corner. Looking particularly at FIG. 6, it can be seen that the beveled edge 42 is comprised of a U-shaped fold having a turned back portion, or flange 44, to define a channel 46.

Cladding member 48 is of like construction to cladding member 36, and thus a detailed description will not be provided. The upper cladding lip 38 of cladding member 36 is extended over shoulder 22 of rail 14 and the lower cladding lip 40 of cladding member 36 is extended over the bottom shoulder 50 of rail 14. It can therefore be seen that cladding member 36 may slide laterally across rail 14 generally parallel to rabbet 24. Cladding member 48 may do likewise with respect to stile 12.

With the window frame assembled cladding members 36 and 48 are slid together (see FIG. 2) so that their respective beveled edges define mitered joint 52, which because of flanges 44, has a cross-section as depicted in FIG. 6.

Cladding members 36 and 48 are held in releaseable engagement by cladding retaining clip 54 (see FIGS. 2, 3 and 6). As best seen in FIG. 3, cladding retaining clip 54 has at one end an edge cover 56 which extends at approximately a right angle to the longitudinal axis of clip 54. At the opposite end of retaining clip 54 is bendable tab 58. As best seen in FIG. 6, the longitudinal edges of tab 54 are turned inwardly along its length to provide U-shaped flanges 60 and 62. Thus, it can be seen that flanges 60 and 62 may be slid into channels 46 so that flanges 44 of cladding members 36 and 48 engage flanges 62 and 60 of retaining clip 54 to provide locking engagement of cladding member 36 to cladding member 48. Retaining clip 54 is slid inwardly until edge cover 56 covers corner edge 64 (see FIG. 2). Thereafter, as depicted in FIG. 5, bendable tab 58 is bent downward as depicted by the arrow in FIG. 5 to secure cladding clip 54 to cladding members 36 and 48.

If window repair work is needed by replacing a broken pane, for example, wood screw 34 is removed, tab 58 is bent upwardly and retaining clip 54 simply slid off to its position shown in FIG. 2. Thereafter, rail 14 and stile 12 may be separated, cladding members 36 and 48 slid off if necessary, a broken window pane repaired and the unit assembled in reverse order simply, quickly and efficiently.

It can therefore be seen that a highly successful, simple and uncomplicated clad window has been provided, which offers not only the advantages of cladding, but also overcomes some of the major deficiencies of clad windows as heretofore experienced.

What is claimed is:

1. A clad window comprising,
    a pair of spaced apart, substantially parallel stiles,
    a pair of spaced apart, substantially parallel rails which join said stiles to form a window frame assembly, and
    metal cladding members which cover at least the front face portion of each of said stiles and rails, each of said cladding members being mitered at their opposite ends, edges which join mitered edges of other cladding members to form a mitered corner juncture, said mitered edges having a portion of each turned back to provide a flange, and
    a cladding retaining clip which releaseably, and slidably, engages the flanges of said mitered edges at each of said mitered corners to releaseably secure said cladding to said stiles and rails and to sealingly cover said mitered corner juncture making it substantially weather impervious,
    each of said cladding members when not retained by said retaining clip being capable of independent sliding movement along the rail or stile that it covers.

2. The clad window of claim 1 wherein said cladding is aluminum cladding.

3. The clad window of claim 1 wherein said retaining clip is also aluminum.

4. The device of claim 1 wherein said cladding retaining clip has, extending transversely to the longitudinal axis thereof, an edge cover.

5. The device of claim 2 wherein said cladding retaining clip has at its end opposite edge cover a bendable tab.

6. The device of claim 3 wherein said cladding retaining clip has each of its longitudinal edges turned inwardly to provide U-shaped flanges lengthwise along its opposite sides.

* * * * *